United States Patent [19]

Rea, Jr.

[11] Patent Number: 4,528,771

[45] Date of Patent: Jul. 16, 1985

[54] SINKER-ANCHOR DEVICE

[76] Inventor: Harold Rea, Jr., 21 W. 333 Walnut Rd., Glen Ellyn, Ill. 60137

[21] Appl. No.: 612,719

[22] Filed: May 21, 1984

[51] Int. Cl.³ ............................................. A01K 95/00
[52] U.S. Cl. ..................................... 43/44.9; 43/44.96
[58] Field of Search .................... 43/44.96, 44.9, 44.13

[56] References Cited

U.S. PATENT DOCUMENTS

| | | | |
|---|---|---|---|
| 1,583,795 | 5/1926 | Pasturzak | 43/44.96 |
| 2,230,456 | 2/1941 | Henze | 43/44.9 |
| 2,770,909 | 11/1956 | Illgner | 43/43.14 |

FOREIGN PATENT DOCUMENTS 1346697  2/1974  United Kingdom .............. 43/44.96

Primary Examiner—Nicholas P. Godici
Assistant Examiner—C. McKee
Attorney, Agent, or Firm—Robert F. Van Epps

[57] ABSTRACT

A sinker-anchor for fishing in moving water and having a weighted body with an open tube extending through and outwardly from the body along the centerline, such that a fishing line is free to pass therethrough. A plurality of anchor prongs extend outwardly of the body to engage the bottom and retain the sinker in a desired location.

6 Claims, 4 Drawing Figures

SINKER-ANCHOR DEVICE

BACKGROUND OF THE INVENTION

1. Field of the Invention

The present invention relates generally to the field of fishing tackle and more specifically to a new and improved sinker-anchor for fishing in moving water.

2. Description of the Prior Art

In fishing generally a sinker is used to assure that the line and hook enter the water. When fishing in moving waters such as rivers or ocean surf, however, the water currents act against the baited hook or lure to move the sinker along the bottom away from the original location selected by the fisherman. One prior solution to this problem has been to simply increase the weight of the sinker. This, however, makes casting more difficult and, in surf casting, virtually impossible due to the extreme weight necessary to overcome the powerful currents.

Prior to the present invention various types of sinker-anchor arrangements have been devised. Typical of such arrangements is the sinker described in U.S. Pat. No. 2,841,916 which issued to N. Ueda on July 8, 1958. The Ueda device comprises a body of weighted material having four arms extending normally outwardly of the body for engaging the bottom. Another such prior art device is described in U.S. Pat. No. 3,466,788 which issued to M. K. Potter on Sept. 16, 1969.

While the above-noted prior art sinker-anchor devices provide some improvement in maintaining position in moving water they still exhibit a number of practical shortcomings. Both have bottom-engaging tines located generally opposite from the end of the sinker to which the fishing line is attached. Thus, when they are to be retrieved, the tines tend to imbed in the bottom and/or snag on obstructions resulting in line breakage. Further, the prior art devices tend to reduce the rod-to-bait sensitivity since the forces of a fish nibbling or striking on the bait are absorbed in significant part by the sinker.

OBJECTS AND SUMMARY OF THE INVENTION

From the preceding discussion it will be understood that among the various objectives of the present invention are included the following:

the provision of a new and improved sinker-anchor for use when fishing in moving waters;

the provision of a device of the above described character which facilitates casting;

the provision of a device of the above described character which is easily retrieved without snagging;

the provision of a device of the above described character having a minimal effect upon rod-to-bait sensitivity.

These and other objectives of the invention are efficiently achieved by providing a weighted body with an open tube extending through and extending outwardly from the body along the centerline thereof such that a fishing line is free to pass therethrough. A plurality of anchor prongs extend outwardly and downwardly from the rod-end of the body to engage the bottom and retain the device in a desired position in moving water.

The foregoing as well as other objectives, features and advantages of the present invention will become more fully understood from the following detailed description taken in conjunction with the various views of the appended drawings.

DESCRIPTION OF PREFERRED EMBODIMENT

Figure 1:
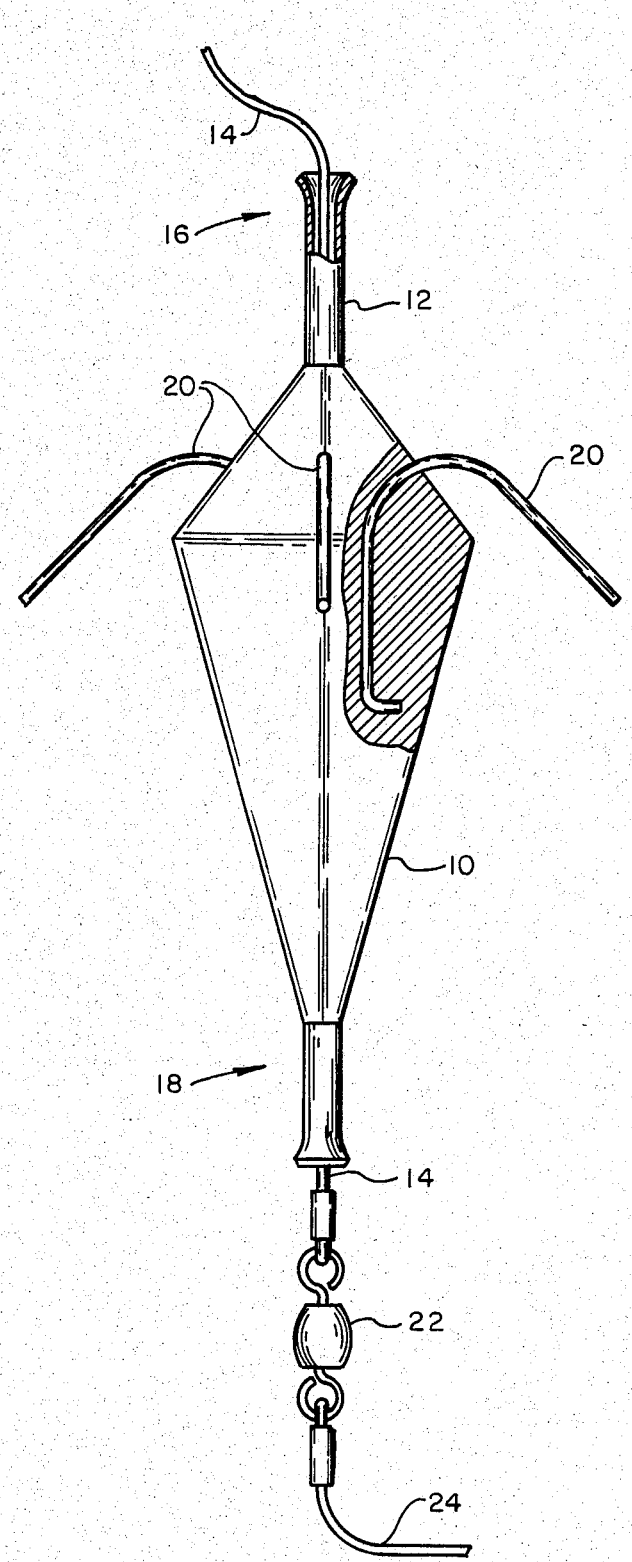
FIG. 1 is a longitudinal cross-section view of a sinker-anchor device in accordance with the principles of the present invention.

With reference now to FIG. 1 there is illustrated a sinker-anchor in accordance with the applicant's invention. The device includes a body 10 which is shown as having a truncated trapezoidal cross-section, however, any geometric configuration would be equally useful. An open tube 12 extends longitudinally through and outwardly from the body 10 such that a fishing line 14 is free to pass therethrough. The ends of the tube 12 may be slightly outwardly flared to minimize abrasion of the fishing line 14. The end of the device which in use is closest to the fishing rod is denominated the rod-end 16 and that closest to the bait and hook, the bait-end 18.

A plurality of anchor prongs 20 are imbedded in the body 10 generally toward the rod-end 16 and extend radially outwardly and curve downwardly toward the bait-end 18.

Since the device is freely movable along the fishing line 14, for casting purposes, it may be located as close to the bait as possible which generally would be the point at which the line 14 is attached to a coupling 22 to the usual leader 24. After casting and the device is anchored in the bottom as will be described below, the line may be permitted to pay out by any desired amount. Once the device is anchored, the fishing line 14 is free to move back and forth through the device and the rod-to-bait sensitivity is minimally affected.

Figure 2A:
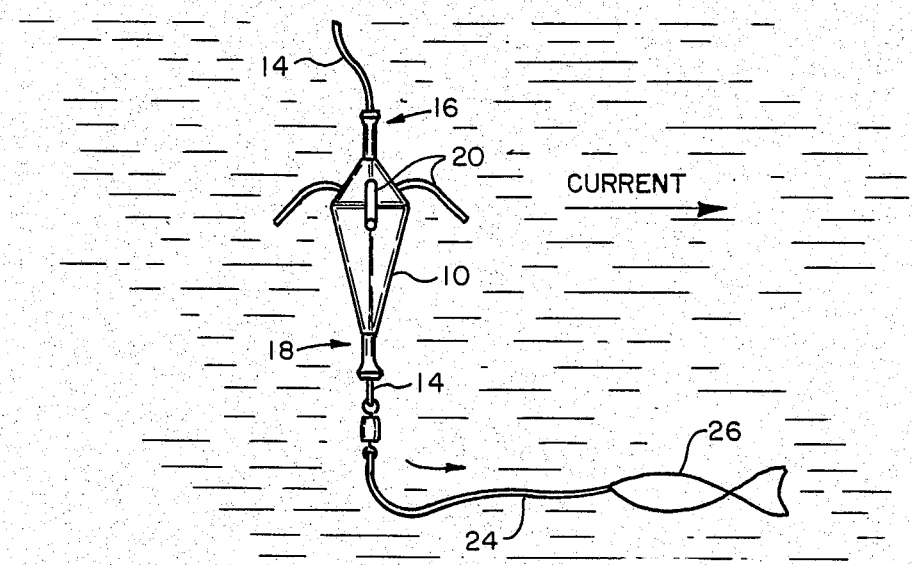
FIG. 2A is a perspective view of the device of FIG. 1 after entry into a body of moving water.
Figure 2B:
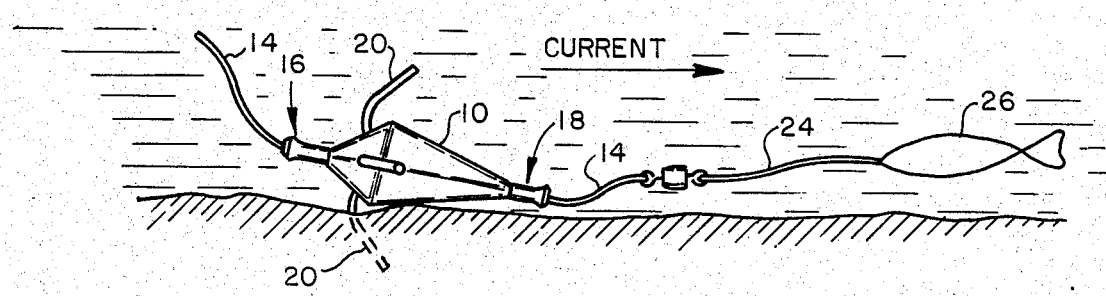
FIG. 2B is a perspective view of the device of FIG. 1 in the achored position.
Figure 2C:
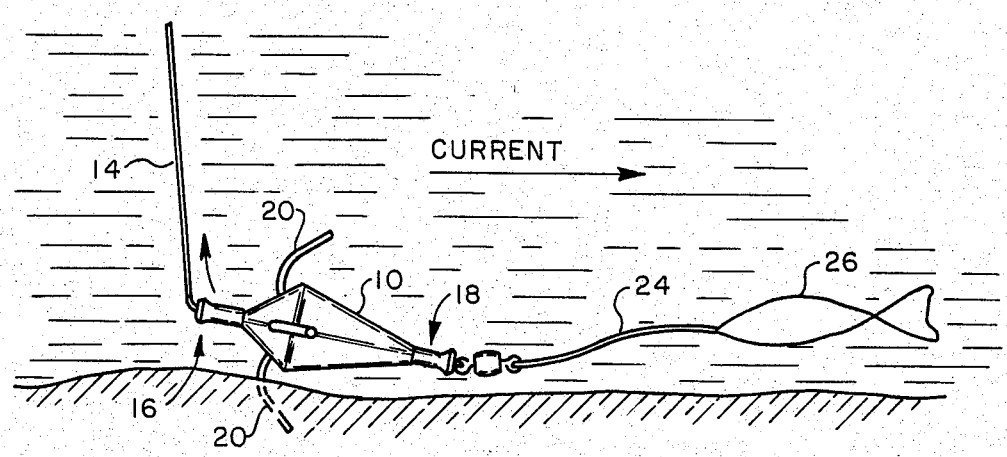
FIG. 2C is a perspective view of the device of FIG. 1 during retrieval.

Turning to FIGS. 2A—2C the operation of the device of FIG. 1 is more clearly illustrated. In FIG. 2A, after the sinker-anchor 22 has entered the water the bait 26 will flow with the current. That portion of the tube 12 extending from the bait-end 18 of the body 10 acts as a lever arm against which the line 14 from the bait operates to turn the device such that the anchor prongs 20 engage the bottom as illustrated in FIG. 2B. Conversely, during retrieval, that portion of the tube 12 extending from the rod-end 16 of the body 10 again acts as a lever arm against which the line 14 from the rod operates to turn the device such as to disengage the anchor prongs 20 from the bottom as illustrated in FIG. 2C. Even if it is necessary for the device to be dragged for some distance along the bottom during retrieval it will be seen that the orientation of the anchor prongs 20 is such that the device will glide easily along the bottom rather than tending to become more deeply imbedded or snagging any obstructions. If, while the sinker-anchor is secured to the bottom, a fish strikes the bait, a quick jerk of the rod will set the hook and disengage the anchor prongs 20 for normal playing of the fish.

As an alternative to the preferred embodiment herein described a solid rod with an eyelet at each end could be substituted for the open tube and would provide the same lever action for engaging and disengaging the anchor prongs from the bottom. Such a configuration would, however, exhibit a reduction in the rod-to-bait sensitivity. Further, while the applicant has found that four equidistant spaced anchor prongs perform adequately, three or more prongs or a solid rim of similar cross-sectional configuration integrally formed with the body would be functionally equivalent.

From the preceding discussion it will be seen that the applicant has provided a new and novel sinker-anchor device for fishing in moving waters wherein the objectives set forth hereinabove are efficiently met. Since certain changes will occur to those skilled in the art without departure from the scope of the invention it is intended that all matter set forth in the above description or shown in the appended drawings be interpreted as illustrative and not in a limiting sense.

Having described what is new and novel and desired to secure by Letters Patent what is claimed is:

1. A sinker-anchor device in combination with a fishing rod, fishing line, and a fishing lure wherein said fishing line extends from said fishing rod terminating with said fishing lure at its end, said sinker-anchor device being located along said fishing line intermediate the rod end and the lure end of said fishing line, said sinker-anchor device comprising:

a weighted body having a rod-end and a lure-end;
a lever arm disposed through and extending outwardly from each end of said weighted body and adapted to receive a fishing line;
a plurality of anchor prongs extending radially outwardly from said rod-end of said weighted body and downwardly toward said bait-end for engaging the bottom of a body of moving water such as to anchor said sinker-anchor in a preselected position.

2. The combination as set forth in claim 1 wherein said lever arm comprises a hollow tube through which said fishing line passes.

3. The combination as set forth in claim 2 wherein the ends of said hollow tube are flared outwardly from the centerline thereof.

4. The combination as set forth in claim 1 wherein said lever arm comprises a solid rod provided at each end thereof with a fishing line attachment means.

5. The combination as set forth in claim 1 wherein at least three said anchor prongs are spaced equidistantly from one another about said lever arm.

6. The combination as set forth in claim 1 wherein said weighted body is relatively larger in cross-section at the rod-end than at the bait-end thereof.

* * * * *